United States Patent [19]

Wester-Ebinghaus

[11] Patent Number: 4,897,539
[45] Date of Patent: Jan. 30, 1990

[54] PROCESS FOR PHOTOGRAMMETRIC DETERMINATION OF A STATIC OBJECT WITH THE USE OF AT LEAST ONE OPTOELECTRICAL SURFACE SENSOR

[75] Inventor: Wilfried Wester-Ebinghaus, Barsinghausen, Fed. Rep. of Germany

[73] Assignee: Rollei Fototechnic Verwaltungsgesellschaft mbH, Braunschweig, Fed. Rep. of Germany

[21] Appl. No.: 179,623

[22] Filed: Apr. 8, 1988

[30] Foreign Application Priority Data

Apr. 9, 1987 [DE] Fed. Rep. of Germany ....... 3712012

[51] Int. Cl.⁴ ............................................. G01C 11/04
[52] U.S. Cl. .................................. 250/216; 358/107; 358/225
[58] Field of Search ............... 250/216, 237 R, 237 G, 250/578; 354/65; 358/12, 109, 107; 356/401; 364/525; 382/1, 68

[56] References Cited

U.S. PATENT DOCUMENTS 4,149,788  4/1979  Brown ................................... 354/65

FOREIGN PATENT DOCUMENTS 3428325  8/1985  Fed. Rep. of Germany .

Primary Examiner—Edward P. Westin
Attorney, Agent, or Firm—Foley & Lardner, Schwartz, Jeffery, Schwaab, Mack, Blumenthal & Evans

[57] ABSTRACT

The invention relates to a process for the photogrammetric acquisition of a static object to be photographed with the aid of at least one optoelectric solid-state area sensor, of which the image area is smaller than that of the total image aimed at, the point array of a reseau (glass plate having suitable point markings distributed in grid fashion) being included in the photogrammetric imaging system and the area sensor being arranged behind the reseau plane in such a way that in each case it images in the sensor image the entire area of at least one mesh of the reseau, camera reseau and object to be photographed being capable of being projected onto the sensor area, which for the benefit of uninterrupted shooting is displaced from reseau mesh to reseau mesh. To improve the practicability of this process, it is proposed that the reseau points are projected with a separate, point illumination source and the imaging of each object point is focused individually by displacing the area sensor in the direction of the optical axis, while keeping constant the coordination of the photographic perspective center with the reseau.

4 Claims, 1 Drawing Sheet

PROCESS FOR PHOTOGRAMMETRIC DETERMINATION OF A STATIC OBJECT WITH THE USE OF AT LEAST ONE OPTOELECTRICAL SURFACE SENSOR

BACKGROUND OF THE INVENTION

The invention relates to a process for the photogrammetric acquisition of a static object to be photographed with the aid of at least one optoelectric solid-state area sensor, of which the image area is smaller than that of the total image aimed at, the point array of a reseau (glass plate having suitable point markings distributed in grid fashion) being included in the photogrammetric imaging system and the area sensor being arranged behind the reseau plane in such a way that in each case it images in the sensor image the entire area of at least one mesh of the reseau, wherein the camera reseau and object to be photographed being capable of being projected onto the sensor area, which for the benefit of uninterrupted shooting is displaced from reseau mesh to reseau mesh.

This process is generally described in DE-A1-3,428,325. If, when using this process, a reseau plate covering the entire image format to be acquired is included in the image formation process, it is then possible during the process of digital image evaluation to use the reseau points simultaneously imaged onto the sensor areas to transfer uniquely into the plane of the reseau the partial images which arise on the areas of the sensor blocks. It is then possible to place only slight demands on the physical positioning of the sensor blocks in the imaging space, which can be realized at little expense using instruments: In each case, the entire area of at least one mesh of the reseau is to be simultaneously imaged onto the sensor areas. By transferring into the reseau plane the partial images which arise on the image areas of the individual sensor blocks, the total image format is obtained with high accuracy, as preset with the calibrated reseau plate.

Among other things, the aforementioned publication shows the arrangement of a sensor block behind the image plane of a photogrammetric imaging system. For a static photographing setup, the total format can be acquired by guiding a single sensor from reseau mesh to reseau mesh in the manner of a flatbed scanner for the benefit of uninterrupted exposure.

SUMMARY OF THE INVENTION

It is an object of the invention to improve the process explained above with regard to its practicability. This object is achieved according to the invention in that the reseau points are projected with a separate, almost point illumination source and the imaging of each object point is focused individually by displacing the area sensor in the direction of the optical axis, while keeping constant the coordination of the photographic perspective center with the reseau.

BRIEF DESCRIPTION OF THE DRAWINGS

With the above as background reference should now be made to the following detailed description of the preferred embodiments and drawings in which.

DETAILED DESCRIPTION OF THE PREFERRED EMBODIMENTS

Figure 1:
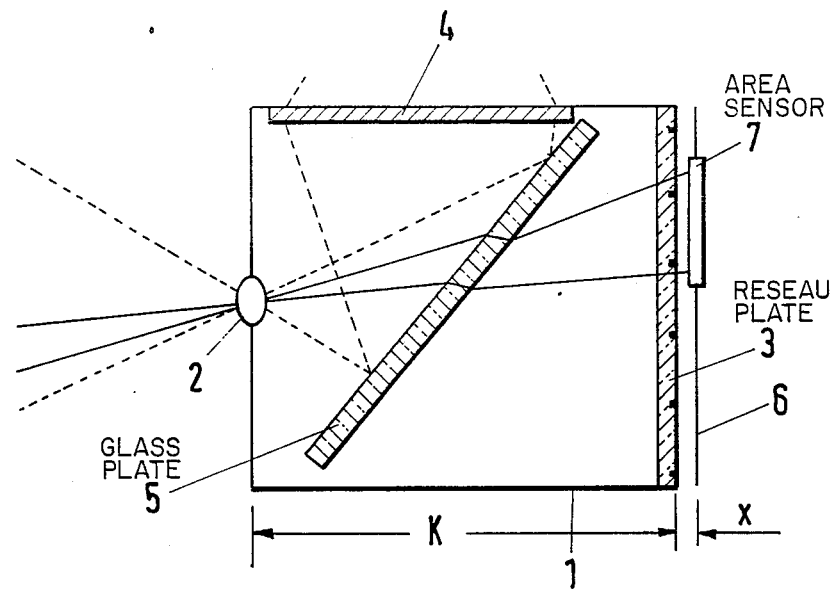
FIG. 1 illustrates a preferred embodiment of the invention at the moment of object imaging.

In the present invention, the image format is not acquired over the whole area simultaneously, but in partial images selectively by means of the sensor. It is therefore suggested according to the invention to displace the sensor in the photographing direction in order to focus individually, as well, for each partial image or, in the extreme case, for each object point to be imaged. If all partial images were projected back into the plane of the camera reseau with the aid of the simultaneously imaged reseau points, it would finally be possible to define all image points in the reference system of a common image plane. This would be the realization of a focusable photogrammetric camera with constant internal orientation, that is to say with image plane and image space reference system, uniformly defined by the reseau, and with a positioning in the image space of the photographic perspective center that was constant for all image points.

However, the usable focusing range depends on the depth within which the reseau points are sufficiently crisply (i.e. sharply) imaged. Since the areal aperture of he camera lens restricts the depth of focus to scarcely more than 0.1 mm, it is possible to realize a focusable reseau camera according to the invention in an optimal fashion only if the reseau points are projected with a separate light source, which is as far as possible a point light source.

However, it will scarcely be possible to use instruments to coordinate the centers of the object and reseau imaging in a rigorously identical way. For this reason, it is to be ensured in a reseau camera designed according to the invention that, because focusing is done by individual image points, object and reseau—regarded in the total image format—are imaged onto a surface which is not flat, so that for spatial separation of the centers of object and reseau projection the object and reseau imaging are not as a whole perspective to one another. This means that the object points imaged on the sensor cannot be projected back into the plane of the camera reseau in a uniformly perspective way together with the imaged reseau points.

For this reason, it is further proposed according to the invention that using not strictly conformal perspective centers object and reseau are projected separately from one another, the imaged reseau points being employed in a first step for the numerical orientation of the sensor in the image space in relation to the reseau, in order then to transform into the coordinate system of the reseau in the direction towards the perspective center of the object imaging the object points imaged on the area sensor. This means that the first step is to use the imaged reseau points to determine by means of spatial resection only the position of the sensor in relation to the camera reseau, doing so on the basis of the coordinates of the center of the reseau projection in the system of the camera reseau. Thereafter, it is possible to use the parameters of the internal orientation of the exposing camera, which define the position of the projection center of the object imaging in relation to the camera reseau, to transfer the imaged object points in a uniformly perspective way from the sensor system orientated spatially over the reseau into the plane of the camera reseau.

For a focusable reseau camera according to the invention the photogrammetric camera calibration must determine the position in the image space not only for the center of the object projection, as for conventional photogrammetric cameras, but also for the center of the reseau projection, both in relation to the system of the camera reseau.

In order to photograph by multiple exposure with several, differently focused image planes an object zone of great extent in depth, which cannot simultaneously over its entire area be imaged crisply onto an image plane, it is proposed according to the invention that the object zone covered by a mesh of the camera reseau is crisply acquired throughout its entire depth through several, differently focused partial images, and these partial images are transferred with the aid of the simultaneously imaged reseau points into the common geometrical reference of a single image plane defined by the particular mesh of the camera reseau, and computationally superimposed there. In this way, there arises a single image, which crisply reproduces the entire object zone covered by the mesh and has an exact, photogrammetrically usable geometry.

Since the sensor positioning is done in an optical manner, the reseau points must have a configuration such that they can be measured as precisely as possible. Using present day methods of correlation and pattern recognition, it is possible to determine black, rightangled crosses with an accuracy of 1 to 3 $\mu$m. This accuracy can be reliably achieved only if the reseau points can be uniquely separated from the background. If, however, reseau point and object have the same blackness, the point cannot be identified and the sensor therefore cannot be positioned.

The separation of reseau and image information can be implemented numerically if the signal intensity of the reseau point differs significantly from that of the background, that is if the difference of the gray values is greater than that of the noise fraction in the image. The accuracy of the point determination deteriorates the greater the noise fraction in the image, and the more inhomogeneous the background.

To avoid the aforementioned disadvantages it is proposed according to the invention to separate object and reseau optically through double exposure, the reseau points first being imaged during an external, separate illumination of the area sensor, without the object information being visible, to store digitally the first sensor image thus obtained, and then to image the object, which has the same geometrical reference to the reseau, and to store, again digitally, the second sensor image thus obtained.

The geometrical reference between the images of the reseau and of the object is known only if the sensor has not changed in the time between the photographs. Consequently, the cycle time must be as short as possible. Commercial CCD video cameras and analog-digital converters operate at a frequency of 1/30 sec. Using two image stores and a suitable control of illumination this cycle time can be achieved.

Figure 2:
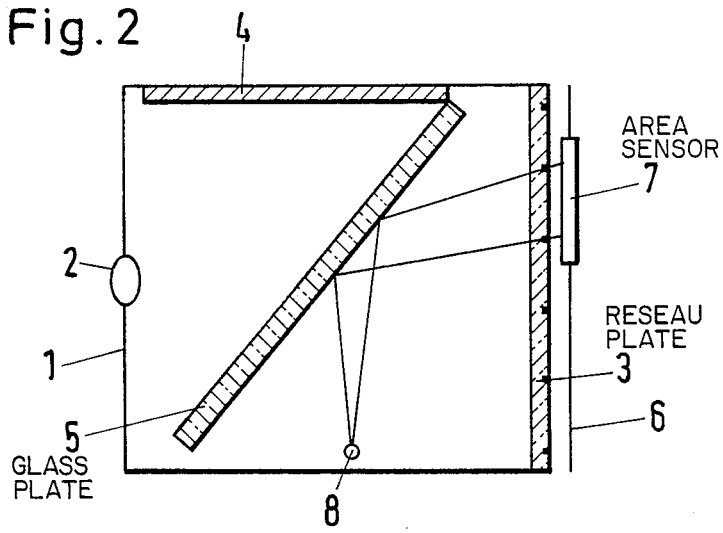
FIG. 2 illustrates the preferred embodiment shown in FIG. 1 at the moment of reseau imaging.

An exemplary embodiment of a reseau camera for executing the process according to the invention is represented schematically in the drawing, in which FIG. 1 shows the moment of the object imaging, and FIG. 2 shows the moment of the reseau imaging.

In the representation are a reseau camera 1 with an objective 2, a reseau plate 3, arranged on the opposite side of the camera, a ground glass screen 4, provided in the upper cover, and a half-silvered glass plate 5 arranged in the interior.

The imaging plane 6 of the reseau camera 1 lies outside the plane of the reseau plate 3. An optoelectric solid-state area sensor 7 is guided in this imaging plane 6. For the purposes of focusing, the area sensor 7 is moved in the direction of the optical axis into the desired imaging plane 6 concerned; accordingly, the distance x marked in the figure is variable, while the distance k between objective 2 and reseau plate 3, equally marked in the figure, remains constant.

FIG. 2 shows a point illumination source 8 for imaging the reseau on the area sensor 7.

What is claimed is:

1. A process for the photogrammetric acquisition of an image of a static object with a photogrammetric imaging system, wherein the photogrammetric imaging system includes at least one optoelectric solid-state area sensor having an image area smaller than that of the total image to be acquired, and a reseau having suitable point markings distributed in a grid fashion, wherein the area image sensor is arranged behind the reseau in such a way to be displaceable from reseau mesh to reseau mesh to thereby image the entire area of at least one reseau mesh and a portion of the image of the static object corresponding to the reseau mesh, said process including imaging the reseau onto the area sensor with a point illumination source and focusing the image of the static object onto the area sensor by displacing the area sensor in the direction of its optical axis.

2. A process as claimed in claim 1, wherein the image of the static object and reseau are projected separately from one another on the area sensor without using strictly conformal perspective centers, wherein the point markings of the reseau are imaged in a first step for the numerical orientation of the sensor in relation to the reseau, in order to then transform the image of the static object into the coordinate system of the reseau in the direction towards the perspective center of the image of the static object.

3. A process as claimed in claim 1, wherein the portion of the image of the static object covered by a mesh of the reseau is acquired throughout its entire depth through several, differently focused partial images, wherein the partial images are transferred with the aid of the imaged point markings of the reseau and computationally superimposed into a common geometrical reference of a single image plane defined by the mesh.

4. A process as claimed in claim 2, wherein the portion of the image of the static object covered by a mesh of the reseau is acquired throughout its entire depth through several, differently focused partial images, wherein the partial images are transferred with the aid of the imaged point markings of the reseau and computationally superimposed into a common geometrical reference of a single image plane defined by the mesh.

* * * * *